United States Patent
Kishimoto et al.

(10) Patent No.: US 6,413,686 B2
(45) Date of Patent: Jul. 2, 2002

(54) RESIN COMPOSITION FOR COLOR FILTER

(75) Inventors: Takehide Kishimoto; Hideaki Yamagata, both of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/837,176

(22) Filed: Apr. 19, 2001

(30) Foreign Application Priority Data

Apr. 26, 2000 (JP) .......................... 2000-125096

(51) Int. Cl.$^7$ ............................ G02B 5/20; G02F 1/1335
(52) U.S. Cl. ............................ 430/7; 430/270.1
(58) Field of Search .................. 430/7, 270.1, 281.1

(56) References Cited

FOREIGN PATENT DOCUMENTS

| JP | 8-006030 A | * | 1/1996 |
| JP | 10-168134 | * | 6/1998 |
| JP | 2000-009919 A | * | 1/2000 |
| JP | 2000-250215 A | * | 9/2000 |
| JP | 2000-329929 A | * | 11/2000 |

* cited by examiner

Primary Examiner—John A. McPherson
(74) Attorney, Agent, or Firm—Parkhurst & Wendel, LLP

(57) ABSTRACT

A resin composition for a color filter is provided which can surely prevent the occurrence of display failures (unacceptable display phenomena) of color liquid crystal display devices, can broaden a range of selection of usable constituent materials, and does not incur increased cost. The resin composition for a color filter comprises a combination of a volatile component with a nonvolatile component, wherein: not less than 50% by weight of the nonvolatile component is accounted for by a first constituent, which, after the impurity extraction of a liquid crystal, permits the liquid crystal to have a voltage retention of not less than 60% and to have a residual DC ($\Delta E$) of not more than 0.6 V; and when less than 50% by weight of the nonvolatile component is accounted for by a second constituent, which, after the impurity extraction of a liquid crystal, cannot permit the liquid crystal to have a voltage retention of not less than 60% and to have a residual DC ($\Delta E$) of not more than 0.6 V, a requirement represented by formula (1) for the relation between the content of the second constituent and the voltage retention and a requirement represented by formula (2) for the relation between the content of the second constituent and the residual DC are satisfied:

Content (wt %)÷voltage retention (%)<0.1     (1)

Content (wt %)×residual DC (V)<5     (2).

3 Claims, 1 Drawing Sheet

RESIN COMPOSITION FOR COLOR FILTER

TECHNICAL FIELD

The present invention relates to a resin composition for a color filter, and more particularly to a resin composition which can realize a liquid crystal display device having excellent display quality.

BACKGROUND ART

In recent years, color liquid crystal display devices have drawn attention as flat displays. One example of the color liquid crystal display devices is a transmission liquid crystal display device such that a color filter comprising a black matrix, a colored layer of a plurality of colors (in general, the three primary colors of red (R), green (G), and blue (B)), a common transparent electrode layer, and an aligning layer is provided so as to face a counter electrode substrate comprising a thin film transistor (a TFT device), an pixel electrode, and an aligning layer, while leaving a predetermined gap between the color filter and the counter electrode substrate, and a liquid crystal material is poured into the gap to form a liquid crystal layer. Another example of the color liquid crystal display devices is a reflection liquid crystal display device wherein, in the above color filter, a reflective layer is provided between the substrate and the colored layer.

In these color liquid crystal display devices, a change in the state of alignment of the liquid crystal caused, for example, by an alignment failure of the liquid crystal, a change in voltage applied to the liquid crystal, and a variation in voltage within the display surface, results in the occurrence of display failures (unacceptable display phenomena) which are classified into sticking and uneven whiteness.

Sticking is a phenomenon such that, when a voltage has been applied to an identical pixel for a given period of time followed by a lowering in voltage or the stop of the application of the voltage, the transmittance of this pixel becomes different from the transmittance of pixels, located around this pixel, to which the voltage has not been applied for the given period of time, and, as a result, an uneven display is visually perceived and is continued even after standing for a long period time. In the sticking phenomenon of normally white panels, the pixel, to which a voltage has been applied for a given period of time, is seen more darkly than pixels located around this pixel. This sticking phenomenon is attributable to the fact that an ionic material is deposited on an electrode during the application of the voltage and, after the stop of the application of the voltage, remains adsorbed on the electrode and, as a result, the voltage derived from the ionic material continues to act on the liquid crystal.

On the other hand, uneven whiteness is a phenomenon such that an uneven display is visually perceived due to the fact that, when a voltage is applied to display a black screen, the transmittance does not become zero in a part of the display region. The cause of this phenomenon is considered as follows. Although the voltage applied across the electrodes should be kept constant, when an ionic material is present in the liquid crystal, this ionic material is moved, that is, a current flows, resulting in a drop of voltage across the electrodes.

Techniques which have taken the above display failure phenomena into consideration include a technique relating to ionic impurities contained in a material composition for liquid crystal devices (Japanese Patent Laid-Open No. 254918/1989), a technique relating to chloride ions and nitrate ions contained in a material composition for liquid crystal devices (Japanese Patent Laid-Open No. 64619/1999), and a technique relating to the amount of water generated from color filters (Japanese Patent Laid-Open No. 133223/1999).

In the prior art techniques, however, target ionic impurities and constituent materials are limited. This poses a problem that the presence of impurities other than the target impurities and the inclusion of impurities in constituent materials other than the target constituent materials result in display failures of color liquid crystal display devices. Further, in the resin composition used in the production of color filters, the kind and amount of impurities vary depending, for example, upon the kind of constituent materials, manufacturers, and names of articles. This has made it difficult to predict the influence of a change in constituent materials on display characteristics of color liquid crystal display devices. Further, it is difficult to specify all of materials causative of display failure phenomena of color liquid crystal display devices. Even though all the materials causative of display failure phenomena have been specified, the range of usable constituent materials is unfavorably significantly narrowed when a resin composition free from any causative material is to be used as the constituent material. Further, in this case, the production cost of the resin composition is increased.

Under these circumstances, the present invention has been made, and it is an object of the present invention to provide a resin composition for a color filter, which can surely prevent the occurrence of display failure phenomena of color liquid crystal display devices, can broaden the range of selection of usable constituent materials, and does not incur increased cost.

DISCLOSURE OF THE INVENTION

The present inventors have considered that a resin member for constituting a color filter in contact with a liquid crystal layer in a liquid crystal display device is one of sources for the above-described ionic materials and have directed attention, as properties having a correlation with display failures caused by ionic materials which have migrated from the resin member into the liquid crystal layer, to voltage retention and residual DC ($\Delta E$) of a liquid crystal after the extraction of impurities from components constituting a resin composition for a resin member.

In order to attain the above object, according to one aspect of the present invention, there is provided a resin composition for a color filter, comprising a combination of a volatile component with a nonvolatile component, wherein:

not less than 50% by weight of the nonvolatile component is accounted for by a first constituent, which, after the impurity extraction of a liquid crystal, permits the liquid crystal to have a voltage retention of not less than 60% and to have a residual DC ($\Delta E$) of not more than 0.6 V; and when less than 50% by weight of the nonvolatile component is accounted for by a second constituent, which, after the impurity extraction of a liquid crystal, cannot permit the liquid crystal to have a voltage retention of not less than 60% and to have a residual DC ($\Delta E$) of not more than 0.6 V, a requirement represented by formula (1) for the relation between the content of the second constituent and the voltage retention and a requirement represented by formula (2) for the relation between the content of the second constituent and the residual DC are satisfied:

$$\text{Content (wt \%)} \div \text{voltage retention (\%)} < 0.1 \quad (1)$$

$$\text{Content (wt \%)} \times \text{residual DC (V)} < 5 \quad (2).$$

According to a preferred embodiment of the resin composition for a color filter according to the present invention, a photoreactive compound as a sublimable component is further contained in the resin composition.

Further, according to a preferred embodiment of the resin composition for a color filter according to the present invention, the nonvolatile component comprises at least one member selected from a pigment, a pigment derivative, and a surfactant.

BEST MODE FOR CARRYING OUT THE INVENTION

Figure 1:
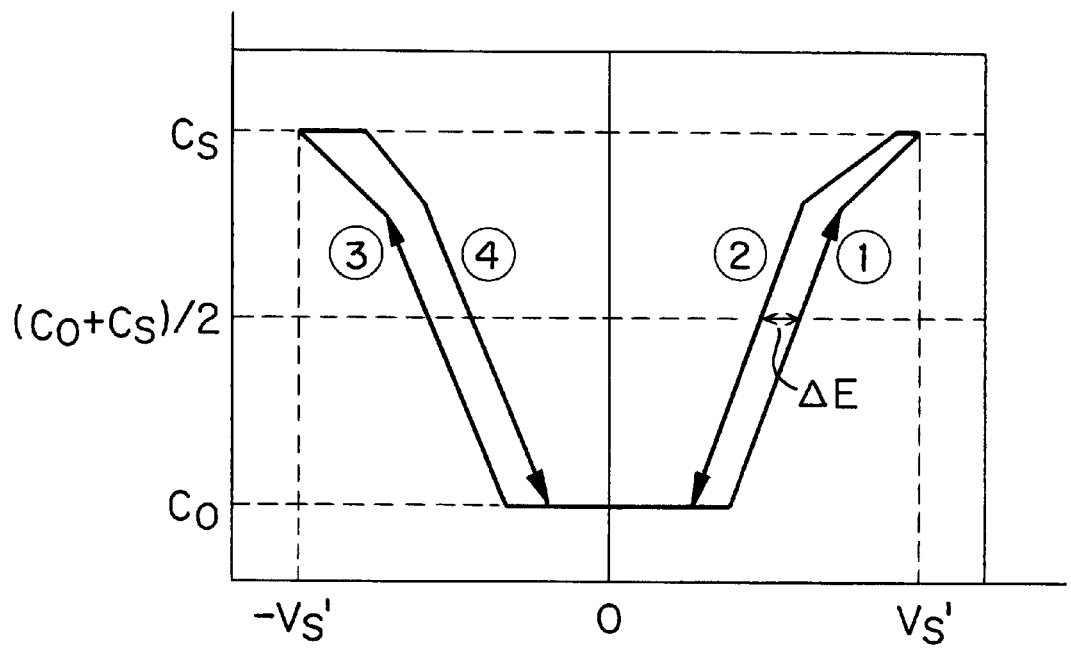
FIG. 1 is a diagram showing a voltage-static capacitance hysteresis loop illustrating residual DC ($\Delta E$)

The best mode for carrying out the invention will be described.

The resin composition for a color filter according to the present invention comprises a combination of a volatile component with a nonvolatile component. Not less than 50% by weight of the nonvolatile component is accounted for by a first constituent, which, after the impurity extraction of a liquid crystal, permits the liquid crystal to have a voltage retention of not less than 60% and to have a residual DC ($\Delta E$) of not more than 0.6 V. The nonvolatile component may comprise two or more constituents. When less than 50% by weight of the nonvolatile component is accounted for by even one kind of a second constituent, which, after the impurity extraction of a liquid crystal, cannot provide the voltage retention and the residual DC ($\Delta E$) falling within the above respective specific ranges, a requirement represented by formula (1) for the relation between the content of the second constituent and the voltage retention and a requirement represented by formula (2) for the relation between the content of the second constituent and the residual DC are satisfied:

$$\text{Content (wt \%)} \div \text{voltage retention (\%)} < 0.1 \quad (1)$$

$$\text{Content (wt \%)} \times \text{residual DC (V)} < 5 \quad (2).$$

When two or more second constituents are present, each second constituent should satisfy the requirements represented by formulae (1) and (2).

Thus, the present inventors have considered, as one of sources for impurities such as ionic materials, a resin member for a color filter, which comes into contact with a liquid crystal layer in a liquid crystal display device, and have directed attention, as properties having a correlation with display failures caused by ionic materials which have migrated from the resin member into the liquid crystal layer, to voltage retention and residual DC ($\Delta E$) of a liquid crystal after the extraction of impurities from components constituting a resin composition for a resin member, and the present invention has been made based on this.

Specifically, keeping the voltage applied across electrodes located on both sides of the liquid crystal layer is necessary from the viewpoint of preventing uneven whiteness as one of display failures, and, to this end, according to the present invention, in a resin composition for a resin member, not less than 50% by weight of the nonvolatile component is accounted for by a first constituent, which, after the impurity extraction of a liquid crystal, permits the liquid crystal to have a voltage retention of not less than 60%, preferably not less than 80%, and more preferably not less than 90%. On the other hand, in order to prevent sticking as another display failure, the residual DC ($\Delta E$) should be minimized so that, when the voltage applied to the liquid crystal layer is stopped, the continuation of the application of unnecessary voltage to the liquid crystal layer is prevented. To this end, according to the present invention, in the resin composition for the resin member, not less than 50% by weight of the nonvolatile component is accounted for by a constituent, which, after the impurity extraction of a liquid crystal, permits the liquid crystal to have a residual DC ($\Delta E$) of not more than 0.6 V, preferably not more than 0.2 V, more preferably not more than 0.1 V. When a second constituent, which, after the impurity extraction of a liquid crystal, cannot permit the liquid crystal to have the voltage retention and the residual DC ($\Delta E$) respectively falling within the above specific ranges, is present in the nonvolatile component, the requirement represented by formula (1) for the relation between the content of the second constituent and the voltage retention and the requirement represented by formula (2) for the relation between the content of the second constituent and the residual DC are satisfied. By virtue of this constitution, a resin member formed of the resin composition according to the present invention, even when brought into contact with a liquid crystal layer in a color liquid crystal display device, does not cause display failures such as sticking and uneven whiteness, and can realize a liquid crystal display device having excellent display quality.

The impurity extraction, conditions for the measurement of voltage retention, and conditions for the measurement of residual DC ($\Delta E$) will be described. (Impurity extraction)

250 mg of a constituent is mixed in 10 g of ethanol. The mixed solution is stirred at 21° C. for 30 min. 0.2 mL of this stirred solution is transferred to a separate vessel, and the vessel is heated at 105° C. to evaporate ethanol. Thereafter, 0.2 g of a liquid crystal is added dropwise to this vessel, and the liquid crystal is held at 105° C. for 5 hr to perform extraction. The liquid crystal used is one which, before the extraction of impurities, has a voltage retention of not less than 95% as measured under the following conditions for the measurement of voltage retention and a residual DC ($\Delta E$) of not more than 0.05 V as measured under the following conditions for the measurement of residual DC ($\Delta E$).

Conditions for Measurement of Voltage Retention

A measurement cell having a layer construction of substrate/electrode/aligning layer/liquid crystal/ aligning layer/electrode/substrate is provided. A liquid crystal, which has been subjected to impurity extraction, is poured, followed by the measurement of voltage retention under the following conditions.

Electrode-electrode distance: 15 $\mu$m
Pulse amplitude of applied voltage: 5 V
Pulse frequency of applied voltage: 60 Hz
Pulse width of applied voltage: 16.67 msec Conditions for Measurement of Residual DC ($\Delta E$)

The residual DC ($\Delta E$) is a voltage shift level (indicated by an arrow shown in FIG. 1) in a static capacitance defined by equation (CO+Cs)/2 determined from the maximum static capacitance (Cs) and the minimum static capacitance (CO) in a voltage-static capacitance hysteresis loop exemplified in FIG. 1. In the measurement, a measurement cell having a layer construction of substrate/electrode/aligning layer/ liquid crystal/aligning layer/electrode/substrate is provided. A liquid crystal, which has been subjected to impurity extraction, is poured, followed by the measurement of residual DC ($\Delta E$) under the following conditions.

Electrode-electrode distance: 15 $\mu$m

Liquid crystal used: a liquid crystal having a static capacitance saturation voltage (indicated by Vs' in FIG. 1) of not more than 10 V Measurement voltage range in voltage-static capacitance hysteresis loop: −10 V to +10 V.

Next, the components of the resin composition for a color filter according to the present invention will be described.

As described above, the resin composition for a color filter according to the present invention comprises at least a volatile component and a nonvolatile component.

Nonvolatile Component

The nonvolatile component is composed mainly of a film forming resin, such as a binder resin or a monomer, and optionally contains a pigment, a pigment dispersant, a pigment derivative, a surfactant and the like. Among the following materials, materials satisfying the above requirements may be selected as the nonvolatile component.

Binder resins usable for the resin composition according to the present invention include ethylene-vinyl acetate copolymers, ethylene-vinyl chloride copolymers, ethylene-vinyl copolymers, polystyrene, acrylonitrile-styrene copolymers, ABS resins, polymethacrylic acid resins, ethylene-methacrylic acid resins, polyvinyl chloride resins, chlorinated vinyl chloride, polyvinyl alcohol, cellulose acetate propionate, cellulose acetate butyrate, nylon 6, nylon 66, nylon 12, polyethylene terephthalate, polybutylene terephthalate, polycarbonate, polyvinyl acetal, polyetherether ketone, polyethersulfone, polyphenylene sulfide, polyallylate, polyvinyl butyral, epoxy resins, phenoxy resins, polyimide resins, polyamide-imide resins, polyamic acid resins, polyetherimide resins, phenolic resins, and urea resins; polymers or copolymers produced from at least one polymerizable monomer selected from methyl acrylate, methyl methacrylate, ethyl acrylate, ethyl methacrylate, n-propyl acrylate, n-propyl methacrylate, isopropyl acrylate, isopropyl methacrylate, sec-butyl acrylate, sec-butyl methacrylate, isobutyl acrylate, isobutyl methacrylate, tert-butyl acrylate, tert-butyl methacrylate, n-pentyl acrylate, n-pentyl methacrylate, n-hexyl acrylate, n-hexyl methacrylate, 2-ethylhexyl acrylate, 2-ethylhexyl methacrylate, n-octyl acrylate, n-octyl methacrylate, n-decyl acrylate, n-decyl methacrylate, styrene, $\alpha$-methylstyrene, N-vinyl-2-pyrrolidone, and glycidyl (meth)acrylate, and at least one member selected from acrylic acid, methacrylic acid, a dimer of acrylic acid (for example, M-5600, manufactured by Toa Gosei Chemical Industry Co., Ltd.), itaconic acid, crotonic acid, maleic acid, fumaric acid, and vinylacetic acid, and their acid anhydrides.

For example, polymers produced by adding a glycidyl- or hydroxyl-containing ethylenically unsaturated compound to the above copolymers may also be mentioned as the binder resin. However, it should be noted that the binder resin is not limited to the above polymers or copolymers.

Among the above binder resins, for example, polymethyl methacrylate resins, polyethyl methacrylate resins, methyl methacrylate-ethyl methacrylate copolymer resins, phenoxy resins, epoxy resins, polycarbonate resins, polystyrene resins, cellulose acetate propionate, cellulose acetate butyrate, ethylhydroxyethylcellulose, and cellulose triacetate are preferred, for example, from the viewpoint of compatibility with a monomer used in combination with the binder resin. Particularly preferred are polymethyl methacrylate resins, polyethyl methacrylate resins, polystyrene resins, copolymers of mechacrylic acid with styrene and glycidyl methacrylate, phenoxy resins, epoxy resins, and modification products thereof.

Epoxy resins, which are particularly preferred as the binder resin, include Epikote Series, manufactured by Yuka Shell Epoxy K.K., CELLOXIDE Series and EPOLEAD Series, manufactured by Daicel Chemical Industries, Ltd., or bisphenol A epoxy resin, bisphenol F epoxy resin, bisphenol S epoxy resin, novolak type epoxy resin, polyglycidyl carboxylate, polyol glycidyl ester, aliphatic or alicyclic epoxy resin, amine epoxy resin, triphenolmethane type epoxy resin, dihydroxybenzene type epoxy resin, and copolymer epoxy resin produced from glycidyl (meth) acrylate and a radically polymerizable monomer.

The content of the binder resin is preferably 10 to 90% by weight, more preferably 20 to 80% by weight, based on the nonvolatile component of the resin composition.

The monomer for the resin composition according to the present invention may be at least one polymerizable compound having a carbon-carbon unsaturated bond. Specific examples thereof include: allyl acrylate, benzyl acrylate, butoxyethyl acrylate, butoxyethylene glycol acrylate, cyclohexyl acrylate, dicyclopentanyl acrylate, 2-ethylhexyl acrylate, glycerol acrylate, glycidyl acrylate, 2-hydroxyethyl acrylate, 2-hydroxypropyl acrylate, isobornyl acrylate, isodecyl acrylate, isooctyl acrylate, lauryl acrylate, 2-methoxyethyl acrylate, methoxyethylene glycol acrylate, phenoxy ethyl acrylate, stearyl acrylate, ethylene glycol diacrylate, diethylene glycol diacrylate, 1,4-butanediol diacrylate, 1,5-pentanediol diacrylate, 1,6-hexanediol diacrylate, 1,3-propanediol acrylate, 1,4-cyclohexanediol diacrylate, 2,2-dimethylolpropane diacrylate, glycerol diacrylate, tripropylene glycol diacrylate, glycerol triacrylate, trimethylolpropane triacrylate, polyoxyethylated trimethylolpropane triacrylate, pentaerythritol triacrylate, pentaerythritol tetraacrylate, triethylene glycol diacrylate, polyoxypropyl trimethylolpropane triacrylate, butylene glycol diacrylate, 1,2,4-butanetriol triacrylate, 2,2,4-trimethyl-1,3-pentanediol diacrylate, diallyl fumarate, 1,10-decanediol dimethyl acrylate, and dipentaerythritol hexaacrylate; monomers wherein the acrylate group of the above compounds has been replaced with a methacrylate group; $\gamma$-methacryloxypropyltrimethoxysilane; 1-vinyl-2-pyrrolidone; 2-hydroxyethyl acryloyl phosphate; acrylate monomers, such as tetrahydrofurfuryl acrylate, dicyclopentenyl acrylate, dicyclopentenyloxyethyl acrylate, 3-butanediol diacrylate, neopentyl glycol diacrylate, polyethylene glycol diacrylate, hydroxypivalic ester neopentyl glycol diacrylate, phenol-ethylene oxide-modified acrylate, phenol-propylene oxide-modified acrylate, N-vinyl-2-pyrrolidone, bisphenol A-ethylene oxide-modified diacrylate, pentaerythritol diacrylate monostearate, tetraethylene glycol diacrylate, polypropylene glycol diacrylate, trimethylolpropane propylene oxide-modified triacrylate, isocyanuric acid-ethylene oxide-modified triacrylate, trimethylolpropane-ethylene oxide-modified triacrylate, pentaerythritol pentaacrylate, pentaerythritol hexaacrylate, and pentaerythritol tetraacrylate; monomers wherein the acrylate group of these acrylate monomers has been replaced with a methacrylate group; (meth)acrylate oligomers, such as urethane acrylate oligomers comprising an acrylate group bonded to an oligomer having a polyurethane structure, polyester acrylate oligomers comprising an acrylate group bonded to an oligomer having a polyester structure, epoxy acrylate oligomers comprising an acrylate group bonded to an oligomer having an epoxy group, urethane methacrylate oligomers comprising a methacrylate group bonded to an oligomer having a polyurethane structure, polyester methacrylate oligomers comprising a methacrylate group bonded to an oligomer having a polyester structure, and epoxy methacrylate oligomers comprising a methacrylate group bonded to an oligomer having an epoxy group; acrylate group-containing polyurethane acrylates; acrylate group-containing polyester acrylates, acrylate group-containing epoxy acrylate resins, methacrylate group-containing polyurethane methacrylates, methacrylate group-containing polyester methacrylates, and methacrylate group-containing epoxy methacrylate resins.

The above monomers are some examples of monomers usable in the present invention, and should not be construed as limiting the present invention. The content of the monomer is preferably 10 to 90% by weight, more preferably 20 to 80% by weight, based on the nonvolatile component of the resin component.

When a pigment is contained as the nonvolatile component, for example, conventional red pigments, yellow pigments, green pigments, blue pigments, violet pigments, and black pigments may be used as the pigment. Specific examples of pigments in terms of color index number include: for red pigments, PR 177, PR 48:1, and PR 254; for yellow pigments, PY83, PY138, PY139, and PY150; for green pigments, PG 7 and PG 36; for blue pigments, PB 15 and the like, PB 1, PB 19, PB 60, and PB 61; and, for violet pigments, PV 23. Specific examples of black pigments include carbon black and metal oxide black pigments (titanium black and pigments containing oxides of copper, iron, manganese, vanadium, nickel and the like). The content of the pigment is preferably 10 to 60% by weight, more preferably 20 to 40% by weight, based on the nonvolatile component of the resin composition.

When a pigment dispersant is contained as the nonvolatile component, pigment dispersants usable herein include: polymeric dispersants, such as modified polyurethanes, modified polyacrylates, modified polyesters, and modified polyamides; and surfactants, such as phosphoric esters, polyethers, and alkylamines. The content of the pigment dispersant is preferably 5 to 40% by weight, more preferably 10 to 20% by weight, based on the nonvolatile component of the resin composition.

When a pigment derivative is contained as the nonvolatile component, pigment derivatives usable herein include: pigment derivatives produced by adding a carboxyl group, a sulfonic acid group, an amino group, a carbonyl group, a sulfonyl group or the like to the skeleton of phthalocyanine, azo, anthraquinone, quinacridone or other pigments; and salts of the above pigment derivatives. The content of the pigment derivative is preferably 1 to 10% by weight, more preferably 2 to 5% by weight, based on the nonvolatile component of the resin composition.

When a surfactant is contained as the nonvolatile component, surfactants usable herein include polyoxyethylene alkyl ethers, sorbitan fatty acid esters, polyoxyethylene alkylphenyl ethers, salts of straight-chain alkylbenzenesulfonic acids, and polyethylene glycol. The content of the surfactant is preferably 1 to 10% by weight, more preferably 2 to 5% by weight, based on the nonvolatile component of the resin composition.

Volatile Component

The resin composition according to the present invention contains a solvent as a volatile component. Examples of solvents usable herein include: alcohols, such as methanol, ethanol, n-propanol, isopropanol, ethylene glycol, and propylene glycol; terpenes, such as α- or β-terpineol; ketones, such as acetone, methyl ethyl ketone, cyclohexanone, and N-methyl-2-pyrrolidone; aromatic hydrocarbons, such as toluene, xylene, and tetramethylbenzene; glycol ethers, such as cellosolve, methyl cellosolve, ethyl cellosolve, carbitol, methyl carbitol, ethyl carbitol, butyl carbitol, propylene glycol monomethyl ether, propylene glycol monoethyl ether, dipropylene glycol monomethyl ether, dipropylene glycol monoethyl ether, triethylene glycol monomethyl ether, and triethylene glycol monoethyl ether; and acetic esters, such as ethyl acetate, butyl acetate, cellosolve acetate, ethyl cellosolve acetate, butyl cellosolve acetate, carbitol acetate, ethyl carbitol acetate, butyl carbitol acetate, propylene glycol monomethyl ether acetate, and propylene glycol monoethyl ether acetate.

Sublimable Component

The resin composition according to the present invention may contain a photoreactive compound as a sublimable component in addition to the nonvolatile component and the volatile component. Examples of photoreactive compounds usable herein include: aromatic ketones, such as benzophenone, Michler's ketone, N,N'-tetramethyl-4,4'-diaminobenzophenone, 4-methoxy-4'-dimethylaminobenzophenone, 4,4'-diethylaminobenzophenone, 2-ethylanthraquinone, and phenanthrene; benzoin ethers, such as benzoin methyl ether, benzoin ethyl ether, and benzoin phenyl ether; benzoins, such as methyl benzoin and ethyl benzoin; halomethylthiazole compounds, such as a dimer of 2-(o-chlorophenyl)-4,5-phenylimidazole, a dimer of 2-(o-chlorophenyl)-4,5-di(m-methoxyphenyl)imidazole, a dimer of 2-(o-fluorophenyl)-4,5-diphenylimidazole, a dimer of 2-(o-methoxyphenyl)-4,5-diphenylimidazole, a dimer of 2,4,5-triarylimidazole, 2-benzyl-2-dimethylamino-1-(4-morpholinophenyl)-butanone, 2-trichloromethyl-5-styryl-1,3,4-oxadiazole, 2-trichloromethyl-5-(p-cyanostyryl)-1,3,4-oxadiazole, and 2-trichloromethyl-5-(p-methoxystyryl)-1,3,4-oxadiazole; halomethyl-S-triazine compounds, such as 2,4-bis(trichloromethyl)-6-p-methoxystyryl-S-triazine, 2,4-bis(trichloromethyl)-6-(1-p-dimethylaminophenyl-1,3-butadienyl)-S-triazine, 2-trichloromethyl-4-amino-6-p-methoxystyryl-S-triazine, 2-(naphtho-1-yl)-4,6-bis-trichloromethyl-S-triazine, 2-(4-ethoxy-naphtho-1-yl)-4,6-bis-trichloromethyl-S-triazine, and 2-(4-butoxy-naphtho-1-yl)-4,6-bis-trichloromethyl-S-triazine; and photopolymerization initiators, such as 2,2-dimethoxy-1,2-diphenylethan-1-one, 2-methyl-1-[4-(methylthio)phenyl]-2-morpholinopropanone, 1,2-benzyl-2-dimethylamino-1-(4-morpholinophenyl)-butanone-1,1-hydroxy-cyclohexyl-phenylketone, Irgacure 369 (manufactured by Ciba-Geigy), Irgacure 651 (manufactured by Ciba-Geigy), and Irgacure 907 (manufactured by Ciba-Geigy). According to the present invention, these photoreactive compounds may be used alone or as a mixture of two or more.

The content of the sublimable component is 5 to 40 parts by weight, preferably 10 to 20 parts by weight, based on 100 parts by weight of the nonvolatile component of the resin composition.

The resin composition according to the present invention may be used to form a colored layer, a black matrix (a light shielding layer), a protective layer, a gap holding material and the like of a color filter.

Figure 2:
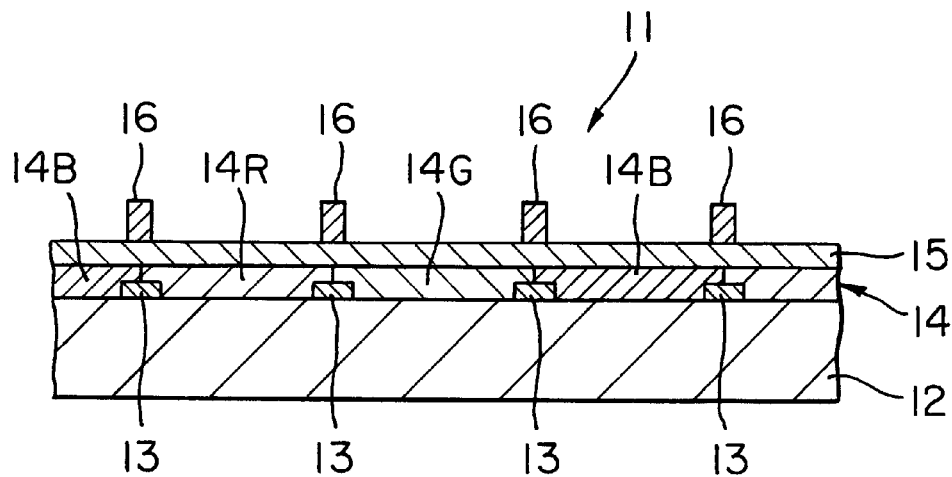
FIG. 2 is a schematic cross-sectional view showing one embodiment of a color filter.

FIG. 2 is a schematic cross-sectional view showing one embodiment of a color filter. In FIG. 2, a color filer 11 comprises: a substrate 12; and, provided on the substrate 12, a black matrix 13 and a colored layer 14 (a red pattern 14R, a green pattern 14G, and a blue pattern 14B arranged in a desired pattern form). A transparent resin protective layer 15 is provided so as to cover the black matrix 13 and the colored layer 14. Further, a transparent gap holding material 16 is provided at a plurality of predetermined sites in the black matrix 13 so as to protrude from the resin protective layer 15.

This color filter 11, after the provision of a common transparent electrode layer and an aligning layer on the resin protective layer 15, is used in a liquid crystal display device. In this case, the resin protective layer 15 and the gap holding material 16 are in positions which come into contact with a liquid crystal layer. When at least the resin protective layer 15 and the gap holding material 16 are formed of the resin composition according to the present invention, the occurrence of display failures such as sticking and uneven whiteness can be prevented and, thus, a liquid crystal display device having excellent display quality can be realized.

In the color filter 11, when the transparent protective layer 15 is not provided, or when the colored layer 14 comes into contact with the liquid crystal layer even in the case where the transparent protective layer 15 is present, the colored layer 14 may be formed of the resin composition according to the present invention. When the black matrix 13 is exposed in a portion between adjacent patterns of the colored layer 14 and thus comes into contact with the liquid crystal layer in the liquid crystal display device, the black matrix 13 may be formed of the resin composition according to the present invention.

EXAMPLES

The present invention will be described in more detail with reference to the following examples.

Preparation of Resin Compositions (1) Resin Compositions for Colored Layer

Beads were added to a composition in a dispersion form (containing a pigment, a pigment derivative, a dispersant, a surfactant, and a solvent). The mixture was dispersed by means of a dispergator for 3 hr, and the beads were then removed therefrom to prepare a dispersion. The dispersion was mixed with a clear resist composition (containing a binder resin, a monomer, an additive, a photopolymerization initiator, and a solvent). Thus, resin compositions for respective color patterns, that is, a resin composition R for a red pattern, a resin composition G1 for a green pattern, a resin composition G2 for a green pattern, a resin composition B1 for a blue pattern, and a resin composition B2 for a blue pattern, were prepared. The formulations of the resin compositions were as follows. A paint shaker was used as the dispergator.

(Resin composition R for red pattern)

| | |
|---|---|
| Red pigment (Cromophtal Red A2B, manufactured by Ciba-Geigy) | 4.8 pts.wt. |
| Yellow pigment (Paliotol Yellow D1819, manufactured by BASF) | 1.2 pts.wt. |
| Dispersant (Solsperse 24000, manufactured by Zeneca Co., Ltd.) | 3.0 pts.wt. |
| Monomer (SR399, manufactured by Sartomer) | 4.0 pts.wt. |
| Binder resin: polymer 1 | 5.0 pts.wt. |
| Initiator (Irgacure 907, manufactured by Ciba-Geigy) | 1.4 pts.wt. |
| Initiator (2,2'-bis(o-chlorophenyl)-4,5,4',5'-tetraphenyl-1,2'-biimidazole) | 0.6 pt.wt. |
| Solvent (propylene glycol monomethyl ether acetate) | 80.0 pts.wt. |

(Resin composition G1 for green pattern)

| | |
|---|---|
| Green pigment (Monastral Green 9Y-C, manufactured by Zeneca Co., Ltd.) | 4.2 pts.wt. |
| Yellow pigment (Paliotol Yellow D1819, manufactured by BASF) | 1.8 pts.wt. |
| Dispersant (Solsperse 24000, manufactured by Zeneca Co., Ltd.) | 3.0 pts.wt. |
| Monomer (SR399, manufactured by Sartomer) | 4.0 pts.wt. |
| Binder resin: polymer 1 | 5.0 pts.wt. |
| Initiator (Irgacure 907, manufactured by Ciba-Geigy) | 1.4 pts.wt. |
| Initiator (2,2'-bis(o-chlorophenyl)-4,5,4',5'-tetraphenyl-1,2'-biimidazole) | 0.6 pt.wt. |
| Solvent (propylene glycol monomethyl ether acetate) | 80.0 pts.wt. |

(Resin composition G2 for green pattern)

| | |
|---|---|
| Green pigment (Monastral Green 6Y-CL, manufactured by Zeneca Co., Ltd.) | 4.2 pts.wt. |
| Yellow pigment (Paliotol Yellow D1819, manufactured by BASF) | 1.8 pts.wt. |
| Dispersant (Solsperse 24000, manufactured by Zeneca Co., Ltd.) | 3.0 pts.wt. |
| Monomer (SR399, manufactured by Sartomer) | 4.0 pts.wt. |
| Binder resin: polymer 1 | 5.0 pts.wt. |
| Initiator (Irgacure 907, manufactured by Ciba-Geigy) | 1.4 pts.wt. |
| Initiator (2,2'-bis(o-chlorophenyl)-4,5,4',5'-tetraphenyl-1,2'-biimidazole) | 0.6 pt.wt. |
| Solvent (propylene glycol monomethyl ether acetate) | 80.0 pts.wt. |

(Resin composition B1 for blue pattern)

| | |
|---|---|
| Blue pigment (Heliogen Blue L6700F, manufactured by BASF) | 6.0 pts.wt. |
| Pigment derivative (Solsperse 12000, manufactured by Zeneca Co., Ltd.) | 0.6 pt.wt. |
| Dispersant (Solsperse 24000, manufactured by Zeneca Co., Ltd.) | 2.4 pts.wt. |
| Monomer (SR399, manufactured by Sartomer) | 4.0 pts.wt. |
| Binder resin: polymer 1 | 5.0 pts.wt. |
| Initiator (Irgacure 907, manufactured by Ciba-Geigy) | 1.4 pts.wt. |
| Initiator (2,2'-bis(o-chlorophenyl)-4,5,4',5'-tetraphenyl-1,2'-biimidazole) | 0.6 pt.wt. |
| Solvent (propylene glycol monomethyl ether acetate) | 80.0 pts.wt. |

(Resin composition B2 for blue pattern)

| | |
|---|---|
| Blue pigment (Heliogen Blue L6700F, manufactured by BASF) | 6.0 pts.wt. |
| Pigment derivative (Solsperse 5000, manufactured by Zeneca Co., Ltd.) | 0.6 pt.wt. |
| Dispersant (Solsperse 24000, | 2.4 pts.wt. |

-continued

| | |
|---|---|
| manufactured by Zeneca Co., Ltd.) | |
| Monomer (SR399, manufactured by Sartomer) | 4.0 pts.wt. |
| Binder resin: polymer 1 | 5.0 pts.wt. |
| Initiator (Irgacure 907, manufactured by Ciba-Geigy) | 1.4 pts.wt. |
| Initiator (2,2'-bis(o-chloro-phenyl)-4,5,4',5'-tetraphenyl-1,2'-biimidazole) | 0.6 pt.wt. |
| Solvent (propylene glycol monomethyl ether acetate) | 80.0 pts.wt. |

The polymer 1 was prepared by adding 16.9% by mole of 2-methacryloyloxyethyl isocyanate to 100% by mole of a copolymer of benzyl methacrylate : styrene : acrylic acid : 2-hydroxyethyl methacrylate = 15.6 : 37.0 : 30.5 : 16.9 (molar ratio), and had a weight average molecular weight of 42500. The same is true of the polymer 1 used in the following other resin compositions.

(2) Resin composition for protective layer
The resin composition for a protective layer was prepared according to the following formulation.
(Resin composition for protective layer)

| | |
|---|---|
| Monomer (SR399, manufactured by Sartomer) | 7.1 pts.wt. |
| Binder resin: polymer 1 | 8.8 pts.wt. |
| Binder resin: epoxy resin (Epikote 180 S70, manufactured by Yuka Shell Epoxy K.K.) | 9.7 pts.wt. |
| Initiator (Irgacure 907, manufactured by Ciba-Geigy) | 1.4 pts.wt. |
| Initiator (2,2'-bis(o-chloro-phenyl)-4,5,4',5'-tetraphenyl-1,2'-biimidazole) | 1.0 pt.wt. |
| Solvent (dimethyl diglycol) | 38.0 pts.wt. |
| Solvent (3-methoxybutyl acetate) | 34.0 pts.wt. |

(3) Resin composition for gap holding material

Two resin compositions S1 and S2 for a gap holding material were prepared according to the following formulations.
(Resin composition S1 for gap holding material)

| | |
|---|---|
| Monomer (SR399, manufactured by Sartomer) | 8.7 pts.wt. |
| Binder resin: polymer 1 | 10.9 pts.wt. |
| Binder resin: epoxy resin (Epikote 180 S70, manufactured by Yuka Shell Epoxy K.K.) | 12.1 pts.wt. |
| Surfactant (Nonion HS-210, manufactured by Nippon Oils & Fats Co., Ltd.) | 1.0 pt.wt. |
| Initiator (Irgacure 369, manufactured by Ciba-Geigy) | 1.2 pts.wt. |
| Initiator (2,2'-bis(o-chloro-phenyl)-4,5,4',5'-tetraphenyl-1,2'-biimidazole) | 1.0 pt.wt. |
| Solvent (propylene glycol monomethyl ether acetate) | 29.1 pts.wt. |
| Solvent (3-methoxybutyl acetate) | 36.0 pts.wt. |

(Resin composition S2 for gap holding material)

| | |
|---|---|
| Monomer (SR399, manufactured by Sartomer) | 8.7 pts.wt. |
| Binder resin: polymer 1 | 10.9 pts.wt. |
| Binder resin: epoxy resin (Epikote 180 S70, manufactured by Yuka Shell Epoxy K.K.) | 12.1 pts.wt. |
| Surfactant (Nonion HS-210, manufactured by Nippon Oils & Fats Co., Ltd.) | 2.0 pts.wt. |
| Initiator (Irgacure 369, manufactured by Ciba-Geigy) | 1.2 pts.wt. |
| Initiator (2,2'-bis(o-chloro-phenyl)-4,5,4',5'-tetraphenyl-1,2'-biimidazole) | 1.0 pt.wt. |
| Solvent (propylene glycol monomethyl ether acetate) | 28.1 pts.wt. |
| Solvent (3-methoxybutyl acetate) | 36.0 pts.wt. |

Impurity Extraction and Measurement of Voltage Retention and Residual DC ($\Delta E$)

For each of the constituents (monomer, binder resin, pigment, pigment derivative, dispersion, and surfactant) of the nonvolatile component in each of the resin compositions, impurity extraction with respect to a liquid crystal (MLC-6847, manufactured by Merck) was carried out by the following method, and the liquid crystal was then measured for the voltage retention and the residual DC ($\Delta E$) under the following conditions for measurement. The results are shown in Tables 1 to 8 below.

The liquid crystal used was such that, before the impurity extraction, the voltage retention as measured under the following conditions for the measurement of voltage retention was not less than 98% and the residual DC ($\Delta E$) as measured under the following conditions for the measurement of residual DC ($\Delta E$) was not more than 0.01 V.

Impurity Extraction Method 250 mg of a constituent was mixed in 10 g of ethanol. The mixed solution was stirred at 21° C. for 30 min. 0.2 mL of this stirred solution was transferred to a separate vessel, and the vessel was heated at 105° C. to evaporate ethanol. Thereafter, 0.2 g of a liquid crystal was added dropwise to this vessel, and the liquid crystal was held at 105° C. for 5 hr to perform extraction.

Conditions for Measurement of Voltage Retention

A measurement cell having a layer construction of substrate/electrode/aligning layer/liquid crystal/aligning layer/electrode/substrate was provided. A liquid crystal, which had been subjected to impurity extraction, was poured, followed by the measurement of voltage retention under the following conditions.

Electrode-electrode distance: 15 $\mu$m
Pulse amplitude of applied voltage: 5 V
Pulse frequency of applied voltage: 60 Hz
Pulse width of applied voltage: 16.67 msec Conditions for Measurement of Residual DC ($\Delta E$)

A measurement cell having a layer construction of substrate/electrode/aligning layer/liquid crystal/ aligning layer/electrode/substrate was provided. A liquid crystal, which had been subjected to impurity extraction, was poured, followed by the measurement of residual DC ($\Delta E$) under the following conditions. Here the residual DC ($\Delta E$) is a voltage shift level (indicated by an arrow shown in FIG. 1) in a static capacitance defined by equation (CO+Cs) /2 determined from the maximum static capacitance (Cs) and the minimum static capacitance (CO) in a voltage-static capacitance hysteresis loop.

Electrode-electrode distance: 15 $\mu$m
Liquid crystal used: a liquid crystal having a static capacitance saturation voltage (indicated by Vs' in FIG. 1) of not more than 10 V
Measurement voltage range in voltage-static capacitance hysteresis loop: −10 V to +10 V.

TABLE 1

(Resin composition R for red pattern)

| | Constituents | Voltage retention, % | Residual DC, V | Content in nonvolatile component, % |
|---|---|---|---|---|
| Non-volatile component | Red pigment | 98 | 0.01 | 26.7 |
| | Yellow pigment | 86 | 0.59 | 6.7 |
| | Dispersant | 94 | 0.03 | 16.7 |
| | Monomer | 91 | 0.10 | 22.2 |
| | Binder resin | 98 | 0.01 | 27.8 |

As is apparent from Table 1, for the resin composition R for a red pattern, all the constituents of the nonvolatile component were such that, after the impurity extraction, the liquid crystal had a voltage retention of not less than 60% and a residual DC ($\Delta E$) of not more than 0.6 V.

TABLE 2

(Resin composition G1 for green pattern)

| | Constituents | Voltage retention, % | Residual DC, V | Content in nonvolatile component, % |
|---|---|---|---|---|
| Non-volatile component | Green pigment | 79 | 0.23 | 23.3 |
| | Yellow pigment | 86 | 0.59 | 10.0 |
| | Dispersant | 94 | 0.03 | 16.7 |
| | Monomer | 91 | 0.10 | 22.2 |
| | Binder resin | 98 | 0.01 | 27.8 |

As is apparent from Table 2, for the resin composition G1 for a green pattern, all the constituents of the nonvolatile component were such that, after the impurity extraction, the liquid(crystal had a voltage retention of not less than 60% and a residual DC ($\Delta E$) of not more than 0.6 V.

TABLE 3

(Resin composition G2 for green pattern)

| | Constituents | Voltage retention, % | Residual DC, V | Content in nonvolatile component, % |
|---|---|---|---|---|
| Non-volatile component | Green pigment | 18 | 1.98 | 23.3 |
| | Yellow pigment | 86 | 0.59 | 10.0 |
| | Dispersant | 94 | 0.03 | 16.7 |
| | Monomer | 91 | 0.10 | 22.2 |
| | Binder resin | 98 | 0.01 | 27.8 |

As is apparent from Table 3, for the resin composition G2 for a green pattern, 76.7% by weight of the nonvolatile component was accounted for by constituents (yellow pigment, dispersant, monomer, and binder resin) such that, after the impurity extraction, the liquid crystal had a voltage retention of not less than 60% and a residual DC ($\Delta E$) of not more than 0.6 V. The green pigment occupying the remaining 23.3% by weight of the nonvolatile component did not satisfy the requirements for the voltage retention and the residual DC ($\Delta E$). Therefore, an examination was done on whether or not the green pigment satisfies the requirement represented by formula (1) for the relation between the content of the green pigment and the voltage retention and the requirement represented by formula (2) for the relation between the content of the green pigment and the residual DC. As a result, as is apparent from the following calculations, it was confirmed that the green pigment did not satisfy both the requirement represented by formula (1) and the requirement represented by formula (2).

Content (wt %)÷voltage retention (%)<0.1     (1)

23.3 (wt %)÷18(%)=1.29>0.1

Content (wt %)×residual DC (V)<5     (2)

23.3 (wt %)×1.98 (V)=46.1>5

TABLE 4

(Resin composition B1 for blue pattern)

| | Constituents | Voltage retention, % | Residual DC, V | Content in nonvolatile component, % |
|---|---|---|---|---|
| Non-volatile component | Blue pigment | 98 | 0.01 | 33.3 |
| | Pigment derivative | 95 | 0.01 | 3.3 |
| | Dispersant | 94 | 0.03 | 13.3 |
| | Monomer | 91 | 0.10 | 22.2 |
| | Binder resin | 98 | 0.01 | 27.8 |

As is apparent from Table 4, for the resin composition B1 for a blue pattern, all the constituents of the nonvolatile component were such that, after the impurity extraction, the liquid crystal had a voltage retention of not less than 60% and a residual DC ($\Delta E$) of not more than 0.6 V.

TABLE 5

(Resin composition B2 for blue pattern)

| | Constituents | Voltage retention, % | Residual DC, V | Content in nonvolatile component, % |
|---|---|---|---|---|
| Non-volatile component | Blue pigment | 98 | 0.01 | 33.3 |
| | Pigment derivative | 0.1 | 2.27 | 3.3 |
| | Dispersant | 94 | 0.03 | 13.3 |
| | Monomer | 91 | 0.10 | 22.2 |
| | Binder resin | 98 | 0.01 | 27.8 |

As is apparent from Table 5, for the resin composition B2 for a blue pattern, 96.7% by weight of the nonvolatile component was accounted for by constituents (blue pigment, dispersant, monomer, and binder resin) such that, after the impurity extraction, the liquid crystal had a voltage retention of not less than 60% and a residual DC ($\Delta E$) of not more than 0.6 V. The pigment derivative occupying the remaining 3.3% by weight of the nonvolatile component did not satisfy the requirements for the voltage retention and the residual DC ($\Delta E$). Therefore, an examination was done on whether or not the pigment derivative satisfies the requirement represented by formula (1) for the relation between the content of the pigment derivative and the voltage retention and the requirement represented by formula (2) for the relation between the content of the pigment derivative and the residual DC. As a result, as is apparent from the following calculations, it was confirmed that the pigment derivative did not satisfy both the requirement represented by formula (1) and the requirement represented by formula (2).

3.3 (wt %)÷0.1(%)=33>0.1

3.3 (wt %)×2.27 (V)=7.49>5

TABLE 6

(Resin composition for protective layer)

| | Constituents | Voltage retention, % | Residual DC, V | Content in nonvolatile component, % |
|---|---|---|---|---|
| Non-volatile component | Monomer | 91 | 0.1 | 27.7 |
| | Binder resin (polymer 1) | 96 | 0.01 | 34.4 |
| | Binder resin (epoxy resin) | 98 | 0.01 | 37.9 |

As is apparent from Table 6, for the resin composition for a protective layer, all the constituents of the nonvolatile component were such that, after the impurity extraction, the liquid crystal had a voltage retention of not less than 60% and a residual DC ($\Delta E$) of not more than 0.6 V.

TABLE 7

(Resin composition S1 for gap holding material)

| | Constituents | Voltage retention, % | Residual DC, V | Content in nonvolatile component, % |
|---|---|---|---|---|
| Non-volatile component | Monomer | 91 | 0.10 | 26.6 |
| | Binder resin (polymer 1) | 98 | 0.01 | 33.3 |
| | Binder resin (epoxy resin) | 98 | 0.01 | 37.0 |
| | Surfactant | 53 | 0.93 | 3.1 |

As is apparent from Table 7, for the resin composition S1 for a gap holding material, 96.9% by weight of the nonvolatile component was accounted for by constituents (blue pigment, dispersant, monomer, and binder resin) such that, after the impurity extraction, the liquid crystal had a voltage retention of not less than 60% and a residual DC ($\Delta E$) of not more than 0.6 V. The surfactant occupying the remaining 3.1% by weight of the nonvolatile component did not satisfy the requirements for the voltage retention and the residual DC ($\Delta E$). Therefore, an examination was done on whether or not the surfactant satisfies the requirement represented by formula (1) for the relation between the content of the surfactant and the voltage retention and the requirement represented by formula (2) for the relation between the content of the surfactant and the residual DC. As a result, as is apparent from the following calculations, it was confirmed that the surfactant satisfied both the requirement represented by formula (1) and the requirement represented by formula (2).

3.1 (wt %)÷53(%)=0.06<0.1

3.1 (wt %)×0.93 (V)=2.88<5

TABLE 8

(Resin composition S1 for gap holding material)

| | Constituents | Voltage retention, % | Residual DC, V | Content in nonvolatile component, % |
|---|---|---|---|---|
| Non-volatile component | Monomer | 91 | 0.10 | 25.8 |
| | Binder resin (polymer 1) | 98 | 0.01 | 32.3 |
| | Binder resin (epoxy resin) | 98 | 0.01 | 35.9 |
| | Surfactant | 53 | 0.93 | 5.9 |

As is apparent from Table 8, for the resin composition S2 for a gap holding material, 94.1% by weight of the nonvolatile component was accounted for by constituents (blue pigment, dispersant, monomer, and binder resin) such that, after the impurity extraction, the liquid crystal had a voltage retention of not less than 60% and a residual DC ($\Delta E$) of not more than 0.6 V. The surfactant occupying the remaining 5.9% by weight of the nonvolatile component did not satisfy the requirements for the voltage retention and the residual DC ($\Delta E$). Therefore, an examination was done on whether or not the surfactant satisfies the requirement represented by formula (1) for the relation between the content of the surfactant and the voltage retention and the requirement represented by formula (2) for the relation between the content of the surfactant and the residual DC. As a result, as is apparent from the following calculations, it was confirmed that the surfactant did not satisfy both the requirement represented by formula (1) and the requirement represented by formula (2).

5.9÷53=0.11>0.1

5.9×0.93=5.49>5

Preparation of Color Filter

Preparation of Sample 1

A glass substrate having a size of 100 mm×100 mm and a thickness of 0.7 mm (7059 glass, manufactured by Corning) was provided as a substrate for a color filter. This substrate was cleaned according to a conventional method. A resin composition having the following formulation for a black matrix was coated on the whole area of one side of the substrate, followed by mask exposure, development, and post baking to form a black matrix (thickness: 1.2 $\mu$m).

| (Resin composition for black matrix) | |
|---|---|
| Black pigment (TM Black #9550, manufactured by Dainichiseika Color & Chemicals Manufacturing Co., Ltd.) | 14.0 pts.wt. |
| Dispersant (Disperbyk 111, manufactured by Bik-Chemie) | 1.2 pts.wt. |
| Polymer (VR60, manufactured by Showa High Polymer Co., Ltd.) | 2.8 pts.wt. |
| Monomer (SR399, manufactured by Sartomer) | 3.5 pts.wt. |
| Additive (L-20, manufactured by Soken Chemical Engineering Co., Ltd.) | 0.7 pt.wt. |
| Initiator (2-benzyl-2-dimethylamino-1-(4-morpholinophenyl)-butanone-1) | 1.6 pts.wt. |
| Initiator (4,4'-diethylamino-benzophenone) | 0.3 pt.wt. |
| Initiator (2,4-diethylthioxanthone) | 0.1 pt.wt. |
| Solvent (ethylene glycol monobutyl ether) | 75.8 pts.wt. |

Next, three resin compositions R, G1, and B1 having the above respective formulations for a colored layer were used to form a colored layer. Specifically, a resin composition R for a red pattern was spin coated on the whole area of the substrate with a black matrix formed thereon. Thus, a photosensitive resin layer for red was formed, and was then prebaked at 90° C. for 3 min. Thereafter, the photosensitive resin layer for red was subjected to alignment exposure using a photomask for a predetermined color pattern, followed by development with a developing solution (a 0.05% aqueous KOH solution) and then post-baking at 200° C. for 30 min to form a red pattern (thickness: 1.5 μm) at predetermined positions relative to the black matrix pattern.

A green pattern (thickness: 1.5 μm) was formed at predetermined positions relative to the black matrix pattern in the same manner as used in the formation of the red pattern, except that the resin composition G1 for a green pattern was used. Further, a blue pattern (thickness: 1.5 μm) was formed at predetermined positions relative to the black matrix pattern in the same manner as used in the formation of the red pattern, except that the resin composition B1 for a blue pattern was used.

Thus, a color filter (sample 1) was prepared which had a structure provided with a colored layer formed so as to cover the black matrix (the same structure as shown in FIG. 2, except that the protective layer and the gap holding material were removed).

Preparation of Sample 2

A color filter (sample 2) was prepared in the same manner as used in the preparation of the sample 1, except that the three resin compositions R, G2, and B1 having the above formulations were used as the resin compositions for a colored layer.

Preparation of Sample 3

A color filter (sample 3) was prepared in the same manner as used in the preparation of the sample 1, except that the three resin compositions R, G1, and B2 having the above formulations were used as the resin compositions for a colored layer.

Preparation of Sample 4

A black matrix was first formed in the same manner as used in the preparation of the sample 1. Next, a colored layer was formed in the same manner as used in the preparation of the sample 1, except that the three resin compositions R, G2, and B2 having the above respective formulations were used. The resin composition for a protective layer having the above formulation was then spin coated so as to cover the black matrix and the colored layer, followed by drying to form a 1.5 μm-thick protective layer. Thus, a color filter (sample 4) was prepared which had the same structure as shown in FIG. 2, except that the gap holding material was removed.

Preparation of Sample 5

The resin composition S1 having the above formulation for a gap holding material was spin coated so as to cover the protective layer in the color filter (sample 4), and the coating was prebaked at 90° C. for 3 min, followed by exposure using a predetermined photomask for a gap holding material and development with a developing solution (a 0.01% aqueous KOH solution). Subsequently, post-baking was carried out at 200° C. for 30 min, whereby a plurality of gap holding materials having a height of 5 μm were formed. Thus, a color filter (sample 5) having a structure as shown in FIG. 2 was prepared.

Preparation of Sample 6

A color filer (sample 6) was prepared in the same manner as used in the preparation of the sample 5, except that the resin composition S2 having the above formulation was used as the resin composition for a gap holding material.

Preparation of Liquid Crystal Display Device

A transparent common electrode of indium tin oxide (ITO) was formed on each of the color filters (samples 1 to 6).

Separately, a glass substrate having a size of 100 mm×100 mm and a thickness of 0.7 mm (7059 glass, manufactured by Corning) was provided as a transparent substrate. This substrate was cleaned according to a conventional method. Thereafter, a thin film transistor (TFT) was formed on the substrate at its plurality of predetermined sites. A transparent pixel electrode of indium tin oxide (ITO) was formed so as to be connected to each TFT in its drain electrode. Thus, a counter electrode substrate was prepared.

Next, a polyimide resin coating composition was coated so as to cover the color filter on its transparent common electrode and the transparent pixel electrode in the counter electrode substrate, and the coating was then dried to form an aligning layer (thickness: 0.07 μm), followed by aligning treatment.

Liquid crystal display devices (samples 1 to 6) were then prepared using these color filters and counter electrode substrates. In this case, MLC-6847 manufactured by Merck was used as a liquid crystal.

Evaluation of Liquid Crystal Display Devices

For the six liquid crystal display devices (samples 1 to 6) thus prepared, image display was continuously carried out under conditions of temperature 20 to 25° C. and relative humidity (RH) 60 to 80% for 72 hr, and the display quality was evaluated according to the following criteria. The results are shown in Table 9.

Evaluation Criteria of Display Quality

◯: Neither sticking nor uneven whiteness occurred, that is, the display quality was very good.

X: Sticking and uneven whiteness occurred, that is, display failure phenomena were observed.

TABLE 9

| Liquid crystal display device | Black matrix | Coating composition for colored layer | | | Protective layer | Coating Composition for columnar convex | Quality of display |
|---|---|---|---|---|---|---|---|
| | | Red | Green | Blue | | | |
| Sample 1 | Provided | R | G1 | B1 | Not provided | — | ○ |
| Sample 2 | Provided | R | G2 | B1 | Not provided | — | X |
| Sample 3 | Provided | R | G1 | B2 | Not provided | — | X |
| Sample 4 | Provided | R | G2 | B2 | Provided | — | ○ |
| Sample 5 | Provided | R | G2 | B2 | Provided | S1 | ○ |
| Sample 6 | Provided | R | G2 | B2 | Provided | S2 | X |

As is apparent from Table 9, for the liquid crystal display devices of samples 1, 4, and 5 wherein, among resin members constituting the color filter incorporated in the liquid crystal display device, the resin member located at a position, which comes into contact with the liquid crystal layer, had been formed using the resin composition according to the present invention, any display failure phenomenon did not occur even in display for a long period of time.

By contrast, for both the liquid crystal display device of sample 2 wherein the green pattern, in the colored layer of the color filter, which comes into contact with the liquid crystal layer, had not been formed using the resin composition according to the present invention, and the liquid crystal display device of sample 3 wherein the blue pattern, in the colored layer of the color filter, which comes into contact with the liquid crystal layer, had not been formed using the resin composition according to the present invention, sticking and uneven whiteness occurred, that is, display failure phenomena were observed.

Further, for the liquid crystal display device of sample 6 wherein the gap holding material, in the color filter, which comes into contact with the liquid crystal layer, had not been formed using the resin composition according to the present invention, sticking and uneven whiteness occurred, that is, display failure phenomena were observed.

As is apparent from the foregoing detailed description, according to the present invention, not less than 50% by weight of the nonvolatile component in the resin composition for a color filter is accounted for by a constituent which, after impurity extraction, permits a liquid crystal to have a voltage retention and a residual DC ($\Delta E$) falling within respective specific ranges. When the nonvolatile component contains a constituent which, after impurity extraction, cannot permit the liquid crystal to have a voltage retention and a residual DC ($\Delta E$) falling within respective specific ranges, the requirement for a specific relation between the content of this constituent and the voltage retention and the requirement for a specific relation between the content of this constituent and the residual DC are satisfied. By virtue of this constitution, a resin member, constituting the color filter, which has been formed using the resin composition according to the present invention, when brought into contact with a liquid crystal layer in a color liquid crystal display device, does not cause display failures, such as sticking and uneven whiteness, and thus can realize liquid crystal display devices possessing excellent display quality. Further, for each constituent of the nonvolatile component, a material satisfying the above specific conditions is selected and used, and, thus, the range of selection of usable constituent materials can be broadened.

What is claimed is:

1. A resin composition for a color filter, comprising a combination of a volatile component with a nonvolatile component, wherein:

not less than 50% by weight of the nonvolatile component is accounted for by a first constituent, which, after the impurity extraction of a liquid crystal, permits the liquid crystal to have a voltage retention of not less than 60% and to have a residual DC ($\Delta E$) of not more than 0.6 V; and when less than 50% by weight of the nonvolatile component is accounted for by a second constituent, which, after the impurity extraction of a liquid crystal, cannot permit the liquid crystal to have a voltage retention of not less than 60% and to have a residual DC ($\Delta E$) of not more than 0.6 V, a requirement represented by formula (1) for the relation between the content of the second constituent and the voltage retention and a requirement represented by formula (2) for the relation between the content of the second constituent and the residual DC are satisfied:

$$\text{Content (wt \%)} \div \text{voltage retention (\%)} < 0.1 \quad (1)$$

$$\text{Content (wt \%)} + \text{residual DC (V)} < 5 \quad (2).$$

2. The resin composition for a color filter according to claim 1, which further comprises a photoreactive compound as a sublimable component.

3. The resin composition for a color filter according to claim 1, wherein the nonvolatile component comprises at least one member selected from a pigment, a pigment derivative, and a surfactant.

* * * * *